Patented Nov. 19, 1929

1,736,665

UNITED STATES PATENT OFFICE

HERMANN PAPE, OF OKER/HARZ, GERMANY, ASSIGNOR TO FRIED. KRUPP GRUSON-WERK AKTIENGESELLSCHAFT, OF MAGDEBURG-BUCKAU, GERMANY

PROCESS OF EXTRACTING VOLATILIZABLE METALS FROM ORES AND METALLURGICAL PRODUCTS

Application filed April 19, 1927, Serial No. 184,994, and in Germany April 26, 1926.

My invention relates to metallurgical processes pertaining to the extraction of volatilizable metals or metal compounds in the form of fumes or vapours from ores, and metallurgical products of various kinds, containing said volatilizable metals as e. g. zinc, tin, lead, arsenic, bismuth, antimony, mercury etc.

Metallurgical processes for the purpose under consideration commonly comprise comminuting the material to be treated and injecting or blowing it in a pulverulent form, mixed with fuel whenever required by the nature of the raw material, into a stationary metallurgical furnace, so as to obtain a reduction and volatilization of the metals and also a combustion of any sulphur which may be contained in the material.

A serious drawback connected with this procedure consists therein that the pulverulent material is not held long enough in suspension in the furnace viz not long enough exposed to and in contact with the flame with regard to the time required for the volatilization, and that a high proportion of the material will, before all the metal is volatilized, drop down rather quick to the bottom of the furnace where it mixes with and is embedded in the slags and other molten residues thus being withdrawn from the attack of the flame, and being lost in the discharged slags.

Great efforts have been made to overcome said drawback by comminuting the material to the highest possible grade of fineness, and also by increasing the temperature within the furnace; but the small percentage of metal recoverable in that way will not justify in practice the expenses entailed thereby.

The object of my invention is to provide an improved process for the extraction of volatilizable metals which can be carried out in practice with greater economy than was possible heretofore, and which will yield better results in regard to the total percentage of metal recoverable from the raw material under treatment.

Figure 1:
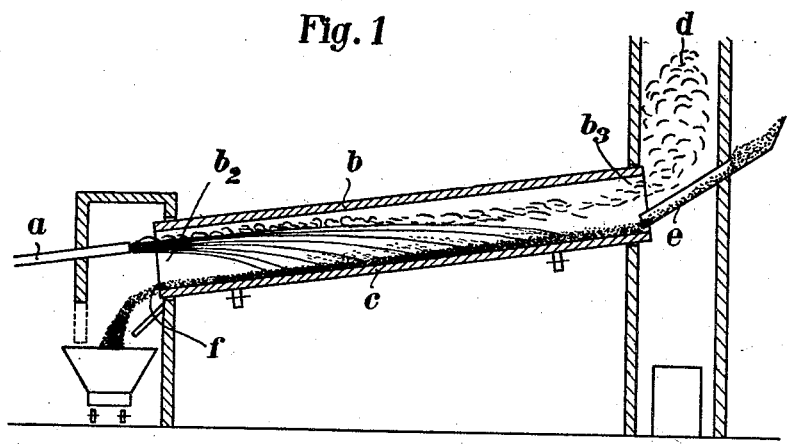
Figure 2:
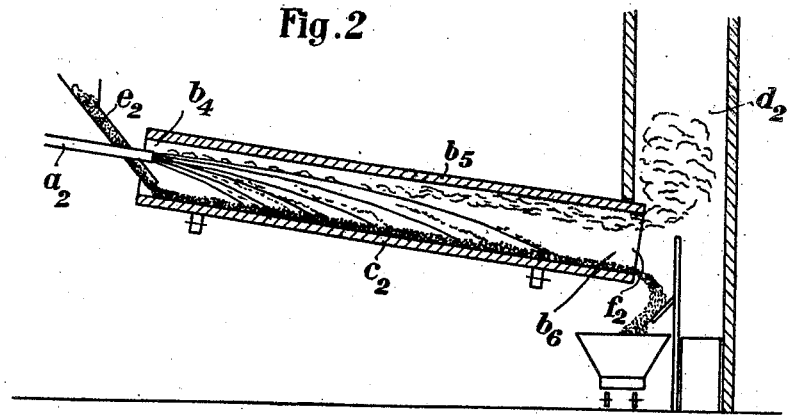

The nature and scope of my invention are briefly outlined in the appended claims, and will be more fully understood from the following specification taken together with the accompanying drawing in which Fig. 1 shows in longitudinal section a metallurgical furnace for carrying out my improved process, Fig. 2 is a longitudinal section through a metallurgical furnace for carrying out the improved process in a modified manner, and shown by way of an example.

In contradistinction to known processes for the extraction of volatilizable metals which are commonly carried out in internally fired stationary furnaces I propose to inject the previously comminuted material in a pulverulent form into a rotary metallurgical furnace so as to heat the material, and to extract the volatilizable metals in the form of fumes and vapours whereby the particles dropping down to the bottom of the heating chamber are agitated and continuously discharged out of the furnace.

In passing through the furnace the material can be agitated and subjected to a subsequent volatilizing action.

By this mode of working it is to be attained that the non-volatilized components of the charge—gangue and metals or compounds of metals—which are deposited sooner or later according to their degree of fineness on the bottom of the chamber, give up a part of their heat owing to the rotary movement to the mantle of the drum and are not subjected to smelting or that the parts which have already become liquid coagulate again before they can agglomerate to lumps of larger size. It may be of advantage to withdraw in the known manner heat out of the mantle of the chamber apart from the natural cooling (loss of heat by radiation) by artificial cooling (air, water etc.) or to avoid an agglomeration of residues by adding stiffening material at the upper end of the chamber.

In this way it is possible to subject the material which drops out from the flame-cone proper before the intended reaction is finished, on the bottom of the rotating drum to a subsequent treatment by radiation of heat, treatment with air or in a given case also by means of reducing or oxidizing materials. The heat resulting from the burning of the reaction products and of the fuel introduced serves to maintain the reaction temperature sufficiently high so that the remainder of the volatilizable metal, which is not volatilized from the material undergoing treatment while it is in the suspended state, is volatilized from the residues on the bottom of the rotating furnace. Reducing agents or other materials which tend to assist the reactions may be introduced into the furnace in the manner described above. These added materials become mixed with and react with the material on the bottom of the furnace and are carried out of the furnace therewith due to the inclined position and rotation of the furnace. Any additional material for reducing purposes that may have to be added in order to obtain a reducing effect should be blown, either at the upper end of the drum or by a special feeding appliance into the material whereby the rotary movement of the chamber causes automatically an intimate mixture with the material. Owing to the inclined position of the bottom of the rotating chamber continuous forward movement in the kiln and a discharge of the residues is attained. Furthermore one is able to adjust the speed of the gases and the time they remain in the kiln in conformity with the local condition by means of the diameter and the length of the kiln, and to obtain thereby a good separation between the solid product of reaction and the metal fumes, oxides etc. which may have to be led away.

When treating sulphurous materials it is possible to combine a very thorough expulsion of the sulphur with the volatilization.

Fig. 1 shows a tubular rotary furnace for carrying out the above outlined process in practice: The comminuted material is injected or blown through a nozzle $a$ by injecting means known per se in the art into the rotating combustion chamber $b$ of the furnace at its lower end $b^2$. The furnace is heated by a flame which may be conveniently produced by burning pulverulent or gaseous fuel mixed with the material or introduced separately, and by supplying reducing agents in a solid or gaseous state.

The gaseous products of combustion containing volatilized metals in the form of fumes or vapors are discharged through the flue $d$ at the upper end $b^3$ of the combustion chamber.

The material $c$ which drops out of the flame onto the inner wall of the combustion chamber will travel along its inclined bottom in counter current to the gaseous products of combustion so as to be discharged at $f$.

In the rotary furnace shown by way of an example in Fig. 2, my process is carried out in a slightly modified form: The comminuted material is injected or blown through nozzle $a^2$ into the upper end $b^4$ of the combustion chamber $b^5$.

As in the case of Fig. 1 the furnace is heated by a flame which may be conveniently produced by burning pulverulent or gaseous fuel mixed with the material or introduced separately, and by supplying reducing agents in a solid or gaseous state. The gaseous products of combustion containing volatilized metals in the form of fumes or vapours are discharged through the flue $d^2$ at the lower end $b^6$ of the furnace.

The material $c^2$ which drops out of the flame onto the inner wall of the combustion chamber $b^5$ will travel therethrough in the same direction as the gaseous products of combustion, and is discharged at $f^2$.

Stiffening agents may be introduced e. g. through a chute $e$.

In passing through the furnace the material can be agitated and subjected to a subsequent very effective volatilizing action by the flame which may be conveniently still enhanced by mixing the material also with oxidizing or reducing agents consistent with its respective nature and composition.

Various changes and modifications may be made in the design and the structural details of rotary furnaces used consistent with the nature of the material to be treated, and in the respective steps for obtaining the best possible results by my improved process without substantially departing from the spirit of this invention.

Thus e. g. the rotary furnace may be given a conical shape having a sloping surface at its bottom such as is shown, for example, in U. S. Patent No. 959,924 to Dedolph.

The process of this invention may be applied to the treatment of a zinc ore as follows:

A poor ore containing about 10% zinc is pulverized to particles of about 1 mm. size and is injected in admixture with carbon into a rotating oven by means of compressed air. The amount of air used is in excess of that necessary for the combustion of the carbon. First the carbon is burned locally in the upper portions of the oven to CO and this reducing gas reduces a part of the zinc oxide contained in the ore. The zinc volatilizes at the prevailing temperature but is again immediately converted into zinc oxide, due to the oxidizing atmosphere which is maintained within the oven, is carried off as oxide along with the oven gases, and is precipitated in a suitable apparatus. The ore particles fall to the bottom of the oven due to their weight, where they become mixed with carbon which is charged through the upper end of the oven, and this mixture slowly travels toward the exit end of the oven in an uninterrupted thin stream due to the inclined position of the oven. Due to the burning of the zinc vapor and the complete combustion of the carbon dust which is injected along with the fine ore, a temperature is maintained throughout the greater part of the oven which heats the ore particles on the bottom of the oven sufficiently so that under the influence of the added reducing agents the reduction and volatilization of the zinc is completed. The zinc free residue is discharged from the oven at its lower end.

What I claim is:

1. Process of recovering volatilizable metals from ores, metallurgical products and the like, which comprises injecting the material to be treated in a finely divided and suspended state into a rotating metallurgical furnace in which an oxidizing atmosphere is maintained, introducing fuel into the furnace, heating the injected material while it is still in a suspended state and volatilizing metal therefrom by burning the fuel, and volatilizing further quantities of metal from the residues which settle to the bottom of the furnace under conditions avoiding slagging or fusion of these residues.

2. Process of recovering volatilizable metals from ores, metallurgical products and the like, which comprises injecting fuel in admixture with the material to be treated in a finely divided and suspended state into a rotating metallurgical furnace in which an oxidizing atmosphere is maintained, burning the fuel whereby the material undergoing treatment is heated and metal volatilized therefrom while the said material is still in the suspended state, mixing fuel with the residues which settle to the bottom of the furnace, and volatilizing further quantities of metal therefrom under conditions avoiding slagging or fusion of these residues.

The foregoing specification signed at Berlin this 5th day of April, 1927.

HERMANN PAPE.